United States Patent
Marino, Jr.

(10) Patent No.: US 7,458,154 B2
(45) Date of Patent: Dec. 2, 2008

(54) METHOD FOR PRODUCING A CATALYTIC ELEMENT

(75) Inventor: Robert R. Marino, Jr., Doylestown, PA (US)

(73) Assignee: ESW Technologies, Inc., Dover, DE (US)

( * ) Notice: Subject to any disclaimer, the term of this patent is extended or adjusted under 35 U.S.C. 154(b) by 467 days.

(21) Appl. No.: 10/954,169

(22) Filed: Oct. 1, 2004

(65) Prior Publication Data

US 2005/0076505 A1    Apr. 14, 2005

Related U.S. Application Data

(60) Provisional application No. 60/509,330, filed on Oct. 8, 2003.

(51) Int. Cl.
*B21D 51/16* (2006.01)

(52) U.S. Cl. .............. 29/890.08; 29/890; 29/455.1; 29/458; 29/527.2; 29/530; 422/177; 422/180; 422/222; 60/299

(58) Field of Classification Search .......... 29/890, 29/890.08, 455.1, 458, 527.2, 530; 422/177, 422/179, 180, 221, 222; 60/299, 311, 322
See application file for complete search history.

(56) References Cited

U.S. PATENT DOCUMENTS

| | | | |
|---|---|---|---|
| 5,724,735 A * | 3/1998 | Ickes et al. | ............. 29/890 |
| 6,066,228 A | 5/2000 | Brunson et al. | |
| 6,136,412 A * | 10/2000 | Spiewak et al. | ............. 428/143 |
| 6,277,784 B1 | 8/2001 | Kruse | |
| 6,284,201 B1 | 9/2001 | Buck | |
| 6,288,008 B1 | 9/2001 | Matsumoto | |
| 6,534,021 B1 | 3/2003 | Maus | |
| 6,544,310 B2 | 4/2003 | Badeau et al. | |
| 7,025,797 B2 * | 4/2006 | Zettel | ............. 55/282.3 |
| 2004/0009106 A1 * | 1/2004 | Galligan et al. | ............. 422/180 |

* cited by examiner

Primary Examiner—Richard Chang

(57) ABSTRACT

A catalytic element may be created by compressing a mesh fabric to reduce its dimension to achieve a desired size and shape. The process begins by braiding or otherwise forming a flat wire into a sheet of mesh fabric and then forming the surface of the sheet with angled ridges. Two sheets are then laid one on top of another with the angled ridges running at an angle to each other. The pair of sheets are then rolled into a cylinder to form a catalytic body. After applying solder to the catalytic body, it is compressed to a desired lesser dimension and then heat is applied to fuse the wires while holding the catalytic body in its compressed size and shape. Next, a precious metal catalytic coating is applied to the fused catalytic body and heat is again applied to bond the precious metal compound to the catalytic body.

11 Claims, 3 Drawing Sheets

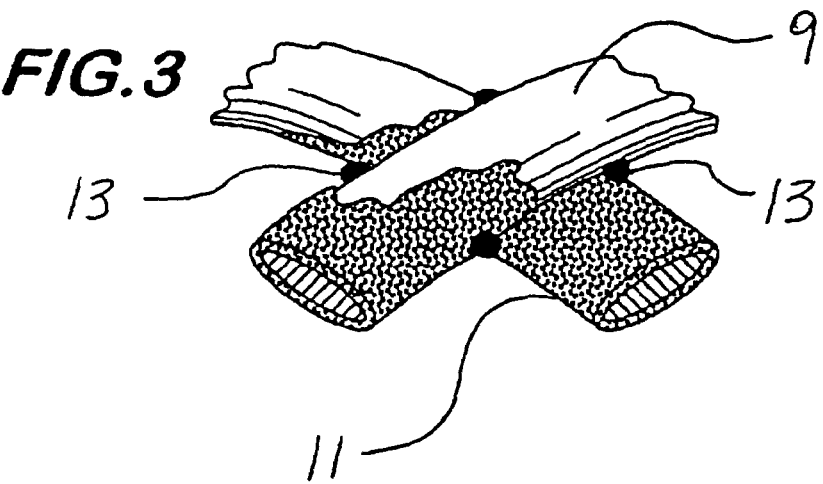
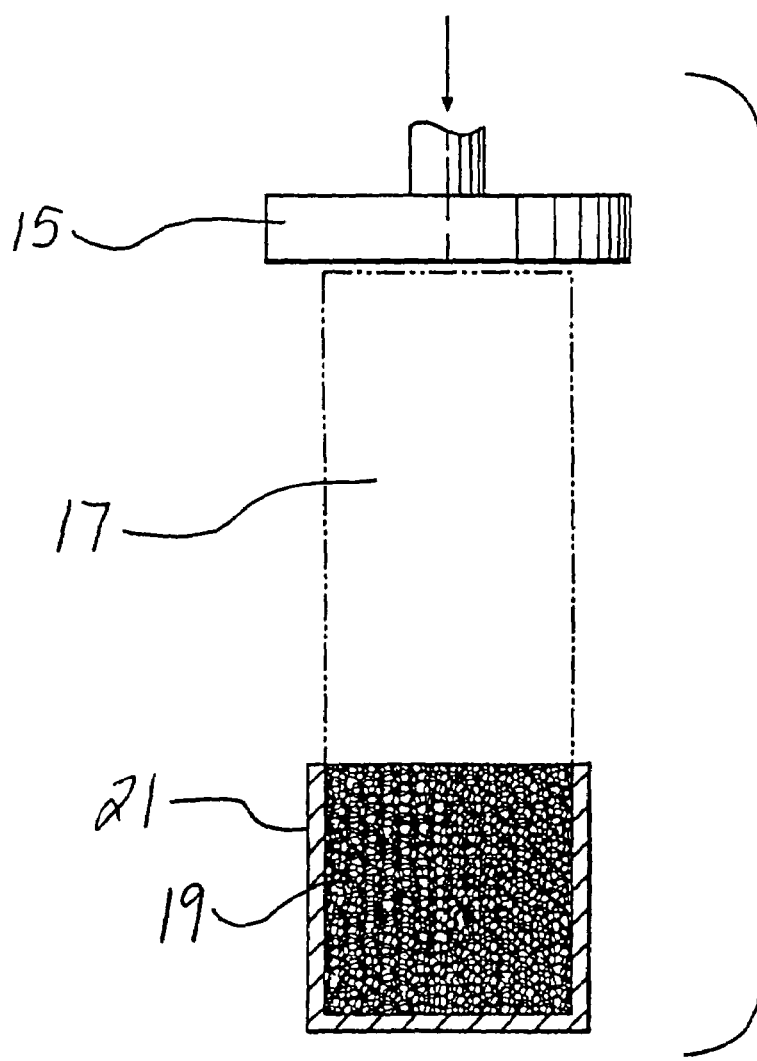

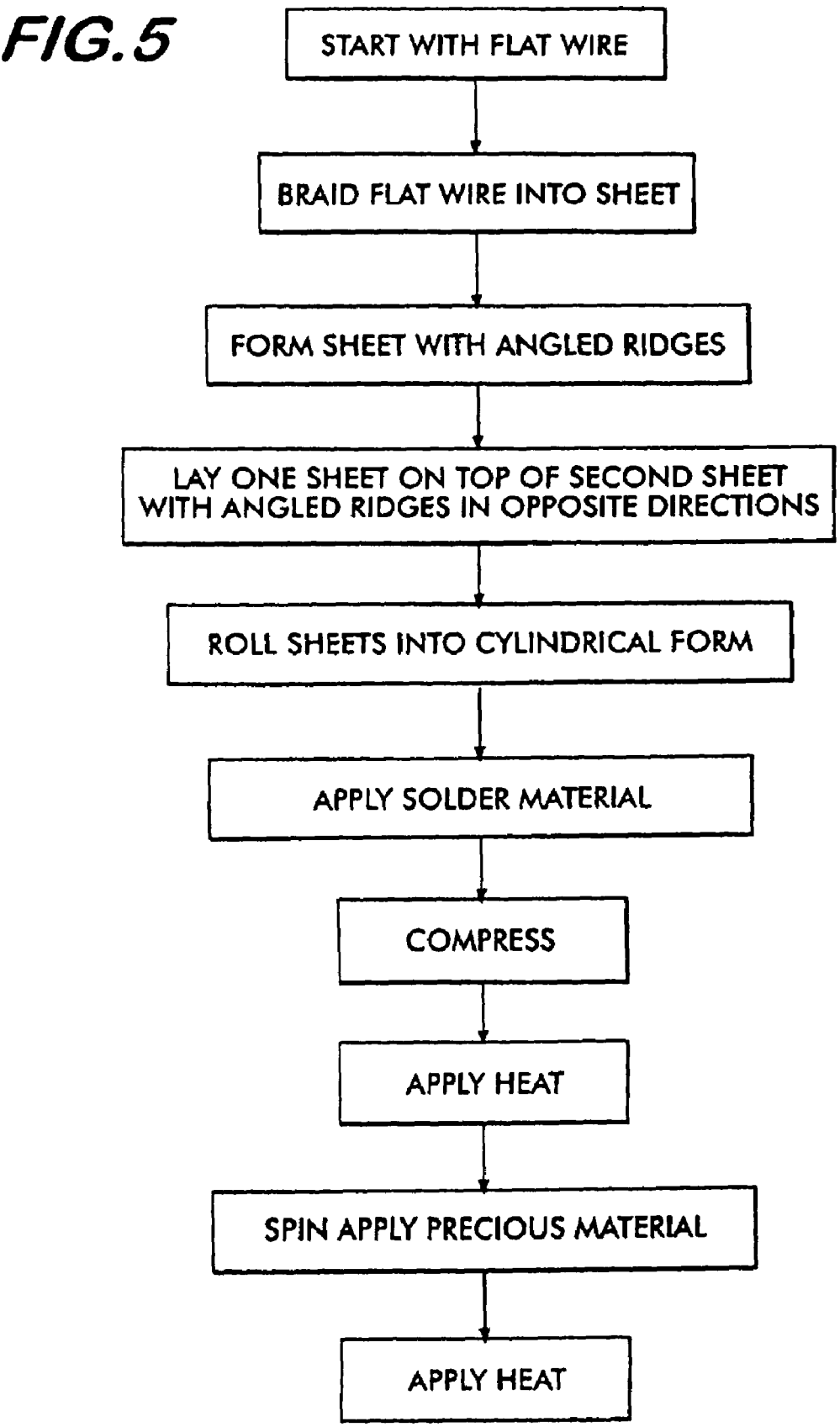

_US 7,458,154 B2_

METHOD FOR PRODUCING A CATALYTIC ELEMENT

RELATED APPLICATION

The present application is related to provisional patent application Ser. No. 60/509,330 entitled "Fused Porous Catalytic Element" filed on Oct. 8, 2003, priority from which is hereby claimed.

FIELD OF THE INVENTION

The present invention relates to a catalytic element for internal combustion exhaust. This device and method of manufacture is related to U.S. patent application Ser. No. 09/698,107 filed on Oct. 30, 2000 entitled "Apparatus and Manufacturing Process for a Diesel Engine Exhaust, Carbon Particulate Reactor." This previous patent application is hereby incorporated by reference as though fully set forth.

BACKGROUND OF THE INVENTION

Knitted fabrics for use as a catalytic converter substrate for motor vehicles are known as disclosed for example in U.S. Pat. No. 6,284,201 issued to Buck. Substrates of this type have been found to be very effective and may be configured by rolling or folding the fibrous fabric into various shapes. This type of fabric is reported to have a high mass transfer to the fiber surfaces with a catalytically active material. In addition, it has a bulk elasticity which makes it insensitive to vibrations and pulsations of the gas flow. A round wire is typically used as the strand material for fabric-type catalytic substrates.

While the prior uses of fabric-type catalytic substrates are shown to be effective, there is still a need for greater efficiencies and greater design control of filtration/catalytic performance. There is a further need to provide a catalytic substrate which provides better crush resistance and eliminates dimensional shrinking and provides a higher temperature rating. Furthermore, there is a need to reduce wash coat loss caused by wire chafing and movement between the knitted fibers.

SUMMARY OF THE INVENTION

In order to meet the needs in the art for an improved catalytic converter substrate, the present invention has been devised. It provides for the use of an angular shaped flat wire. The use of a flat wire is shown to provide better wash coat adhesion and the angular side edges cause greater gas turbulence compared to round wire. Furthermore, the invention provides for fusing the knitted wires together once their desired dimensional shape has been achieved. This fusing transforms the soft mesh spool into a rigid structure that provides better crush resistance from any direction. It also eliminates dimensional shrinking and increases surface hardness and individual strand strength.

The desired dimensional configuration of the catalyst of the invention may be achieved by compressing the mesh fabric to reduce its dimension in the line of the compression. It has been found that this can be done in a very controlled manner with even density distribution as a result of the natural elasticity of the knitted or woven configuration. This provides a higher temperature rating as well as reduces wash coat loss caused by wire chafing and movement between the wires.

More specifically, the applicant has invented a method of producing a catalytic element for conditioning the exhaust of an internal combustion engine, comprising the steps of providing a supply of flat wire, forming the wire into a fabric sheet by one of the methods consisting of braiding, knitting, or weaving, and forming raised areas by deforming the fabric sheet. The raised areas can be angled ridges formed by deforming the fabric sheet by stamping. The surfaces of two corrugated fabric sheets are arranged so that overlapping portions include pleats and ridges that cross at an angle forming a two-ply substrate material. The two-ply substrate may be formed by folding a single sheet of the fabric. The two-ply substrate material is then rolled into a cylindrical shape. Solder is applied to the cylindrical substrate which is then compressed in the axial direction utilizing a ram press that compresses the cylindrical substrate into a smaller compressed volume which is constrained by a mold. Heat is applied to melt the solder and thereby fuse the wires while the cylindrical substrate is held in a compressed state. Finally, a precious metal coating is applied to the fused cylindrical substrate by spin coating and then heat is applied to affix the coating.

DESCRIPTION OF THE DRAWINGS

FIG. 3 is an isometric view of two intersecting strands of fused material.

FIG. 4 is a partially sectioned side view showing the compression of the substrate material of the invention with the uncompressed dimension of the substrate material shown in phantom lines.

FIG. 5 is a flow chart depicting the manufacturing process of one embodiment.

DESCRIPTION OF THE PREFERRED EMBODIMENT

Figure 1:
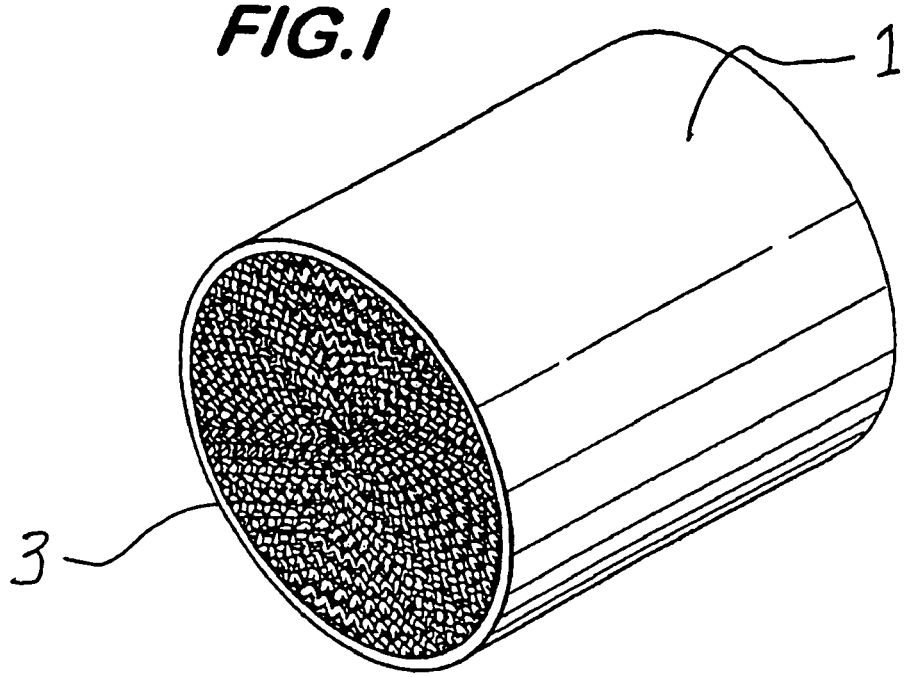
FIG. 1 is a top right front isometric view of the invention including a coiled knitted or woven substrate 3 first wound into a cylindrical shape.

FIG. 1 shows a catalytic converter casing 1 which houses the fabric catalyst of the present invention 3. In this embodiment, the fabric of the catalyst has been wound into a cylindrical shape with overlapping adjacent surfaces. Other shapes or configurations are possible and the fabric can be folded or cut into sections, each section laid one on top of the other. The raw metal fabric is comprised of multiple ribbons of shaped wires, say for example 20 ribbons of shaped wires or flat-surfaced metal strips. The strips or wires can be woven or knitted into a metal fabric, metal cloth, metal thatch, or open-mesh fabric that, as an example, could be 3 inches wide and 100 feet long.

Figure 2:
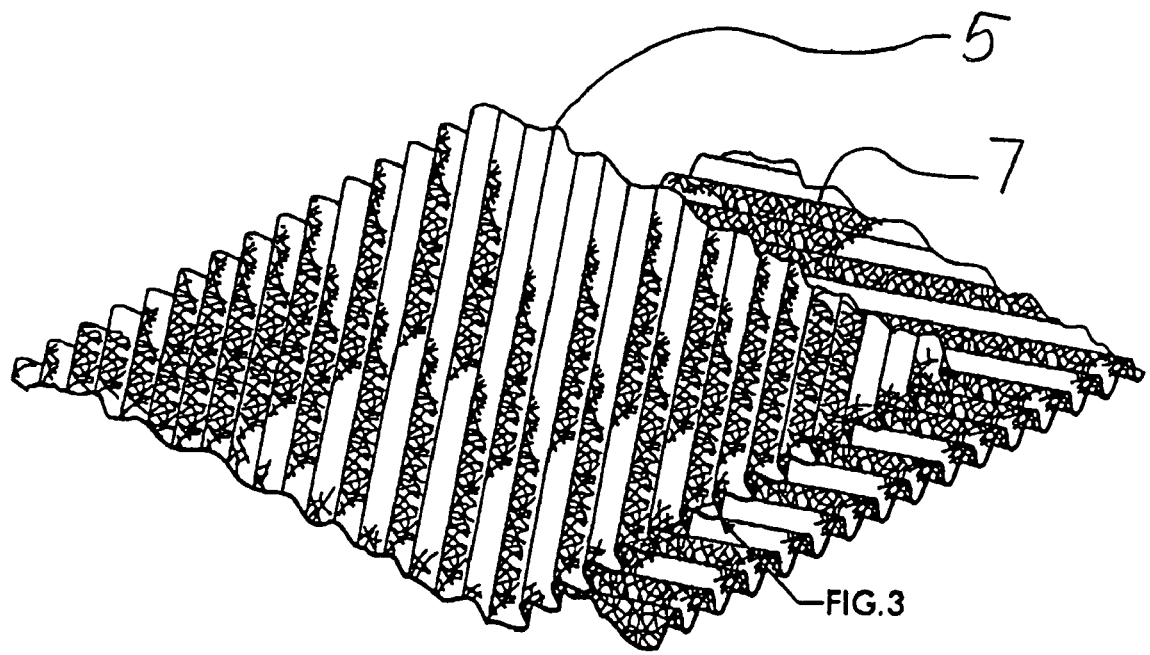
FIG. 2 shows two adjacent plies of pleated substrate material with the direction of the pleats crisscrossing.

Referring now to FIG. 2, the surface of the material is corrugated so that overlapping sections 5 and 7 include pleats and ridges that cross at an angle. This occurs naturally as an inherent result of folding the material and then winding the two layer sheet upon itself about an axis. Thereby, the ridges act as a standoff to separate successive layers of the material. This is also achieved by pressing or stamping raised shapes or features into the full length and width of the fabric. The raised features can have dimensions such as: 0.25" high by 0.25" wide, and 0.25" between the features. The features can be in rows of multiple raised features.

An angled orientation of the rows is important to substrate performance. The rows should be oriented at angles relative to the fabric length such as 65 degrees or 45 degrees. The features can also be designed as a series of single larger features that span the entire width of the fabric, such as a triangular or square-shaped corrugation, the triangular corrugation having dimensions of 0.25" high and 0.25" wide at the base and 0.25" between the rows. These rows can be oriented 90 degrees to the length of the fabric or, in an angular orientation such as 45 degrees to the fabric's length.

The functional importance of the raised features is twofold. The first is to separate layers of fabric which is important in the manufacturing process, and the second is to direct and deflect the gas into a turbulent flow. In one embodiment, a spool is created by winding the mesh fabric with adjacent layers each having raised features positioned one over the other. The raised features serve to separate the two layers from "nesting" thereby ensuring uniform layers. If the fabric has features oriented at an angle relative to the length of the fabric, each fabric layer is positioned with the features running counter-directional to the other. The double layered strips of fabric are then rolled into a soft, spongy, flexible spool of any predetermined diameter or alternatively fan-folded and cut to any desired three-dimensional configuration.

Referring now to FIG. 3, the individual wire structure of one embodiment of the present invention is shown. According to the method of manufacturing the present invention, an intersection of woven or knitted wire elements 9 and 11 is fused by bonding material 13 at points where the wires intersect. As further described herein, every woven loop adjoining or intersecting at any point becomes permanently fused and thereby the soft spool is hardened into a ridged unitary element. This is achieved by applying powdered metal and other materials to the spool, and then firing it to a high temperature in an inert or vacuum atmosphere. A soft spool can be fused in several different conditions: it can be fused alone, without any wrapper/enclosure; it can be stuffed into a metal wrapper/enclosure where the wrapper serves as a permanent mold, and becomes a permanent part of the fused, single piece element; or it can be placed into a removable mold, and then fused.

If fusing occurs without a wrapper or enclosure, the soft spool is drenched with liquid slurry, containing a combination of fine powdered metals such as nickel, chromium, boron, and other materials such as silicon, phosphorous and others. After saturation, the excess slurry is drained off. Alternately, the excess slurry material can be removed with centrifugal dispersion. After drenching and draining, the mesh spool is then dried. When dried, all spool surfaces are left with a thin film of the fine powdered metals and other materials. The coated elements are then placed in a furnace and fired at a high temperature, in a non-oxidizing atmosphere or vacuum. At high temperature, the previously applied powdered metals melt and flow. In the process of melting and flowing, metal fills the gaps between all intersecting surfaces, as well as melting into the surface of the wires. In doing so every woven loop, adjoining layer, or intersection of any kind becomes permanently fused with its counterpart.

Where a removable mold is used a soft spool is coated, stripped of excess slurry, and then placed in the removable mold. Referring now to FIG. 4, the compression technique of the present invention utilizes a simple ram press 15 which compresses an original dimension of the knitted or woven fabric into a smaller compressed volume 19 which is constrained by a mold 21. Compressing the structure of the catalyst allows the density of the catalytic element to be altered. This may be accomplished by either compressing the wound fabric in a temporary mold or in the final casing of the catalytic unit. The mold establishes and holds each soft and resilient spool to a uniform size, shape, and compression specification throughout the fusing process (i.e.: oval shape, square shape, etc.). The spool is dried and fired in the mold. The mold is then removed, leaving a solid, properly shaped element. Alternately, if the wound fabric is compressed into the final casing of the catalytic unit, then the final result of this process is a ridged one-piece porous element fused permanently to the sides of the casing.

In all cases fusion is achieved by subjecting the configured and coated substrate to a high temperature sufficient to cause the powdered metal coating materials to melt, flow, and "fuse" each ribbon of metal to the next as shown in FIG. 3. During this process, the brazing metal flows and collects at any point where ribbons contact each other. The flowing molten metal beads around the intersecting ribbons and then fully fuses into them. In addition, and significantly important to the durability of the element as a catalytic substrate, the fusing metals serve to significantly "surface harden" the metal ribbons comprising the fabric. Fusing transforms the soft, spongy metal fabric spool into a single, ridged, porous metal structure. Significant added strength because of the stiffening effect, as well as increased high temperature oxidation resistance, are two important advantages gained by this fusion process.

Referring now to FIG. 5, a method of manufacturing the preferred embodiment of the invention is depicted by this chart. The invention comprises providing a flat wire, braiding the flat wire into a sheet of fabric, forming the sheet with angled ridges, laying one sheet on top of another with the said angle ridges running at an angle to each other, rolling the sheets into a cylinder to form a catalytic body, applying solder material to the catalytic body, compressing the catalytic body to a lesser dimension, applying heat to fuse the wires of the catalytic body by the solder material, applying a precious metal catalytic coating to the fused catalytic body, and applying heat to bond the precious metal compound to the catalytic body. By this process, a rigid porous catalytic element is formed having fused loops, intersections, and layers.

The product produced by the above-described process exhibits the following functional properties.

1. Dramatically better compression resistance from any direction.
2. Eliminates dimensional shrinkage in operation caused by layer "nesting."
3. Increased individual wire strength.
4. Increased temperature rating.
5. Improved metal oxidation resistance.
6. Reduced wash coat loss, previously caused by wire chafing and movement over time.
7. Provides repeatable size and shape.

Thus, it will be seen that the above-described objects and advantages of the invention have been achieved. It should be understood, however, that there may be many modifications, adaptations and changes that may be made without departing from the invention disclosed herein, which should be determined only by the following claims and their legal equivalents.

What is claimed is:

1. The method of producing a catalytic element for conditioning the exhaust of an internal combustion engine, comprising the steps of:

providing a supply of wire;

forming the wire into a fabric sheet by one of the methods consisting of braiding, knitting, or weaving;

forming raised areas by deforming the fabric sheet into features consisting of rows of parallel alternating ridges and pleats, said features being oriented at an angle relative to the length of the fabric;

arranging only two of said deformed fabric sheets face-to-face to form a two-ply substrate material;

rolling said two-ply substrate material into a cylindrical shape with the features of each sheet running counter-directional to the other so that no pleat of one sheet nests with any pleat of the other sheet;

applying solder to said cylindrical substrate;

compressing said cylindrical substrate axially to significantly reduce its volume and increase its density; and applying heat to melt said solder and thereby fuse said wires while said cylindrical substrate is held in a compressed state.

2. The method of claim 1 further including the additional final steps of applying a precious metal coating to said fused cylindrical substrate by spin coating and then applying heat.

3. The method of claim 1 wherein said wire is flat wire.

4. The method of claim 1 wherein said raised areas are angled ridges formed by deforming the fabric sheet by stamping.

5. The method of claim 4 wherein the surface of said fabric sheet is corrugated and the two-ply fabric sheets are arranged so that overlapping portions include pleats and ridges that cross at an angle.

6. The method of claim 1 wherein said two-ply substrate is formed by folding a single sheet of said fabric.

7. The method of claim 1 wherein said step of compressing said cylindrical substrate utilizes a ram press that compresses and deforms the cylindrical substrate to a smaller compressed volume which is constrained by a mold.

8. The method of claim 7 wherein said step of compressing the cylindrical shape substrate is performed in the axial direction.

9. The method of claim 1 wherein the wire is a flat-surfaced metal strip of wire.

10. The method of manufacturing a catalytic element for a diesel engine particulate reactor, comprising the steps of:

providing a flat wire;

braiding the flat wire into a sheet of fabric;

forming angled ridges in the sheet;

laying one sheet on top of another forming a two-layer sheet with said angled ridges running at an angle to each other so that any one pleat between the ridges of one sheet does not nest with any pleat of the other sheet;

spooling the two-layer sheet into a cylinder to form a catalytic body;

applying solder material to the catalytic body;

axially compressing the catalytic body to a lesser longitudinal dimension;

applying heat to fuse the wires of the catalytic body;

applying a precious metal catalytic coating to the fused catalytic body; and applying heat to bond the precious metal to the catalytic body.

11. The method of producing a catalytic element for conditioning the exhaust of an internal combustion engine, comprising the steps of:

providing a flat wire; braiding the flat wire into a sheet of fabric; forming angled ridges in the sheet; laying one sheet on top of another forming a two-layer sheet with said angled ridges running at an angle to each other so that any one pleat between the ridges of one sheet does not nest with any pleat of the other sheet; spooling the two-layer sheet into a cylinder to form a catalytic body;

compressing said cylindrical substrate axially to significantly reduce its volume and to achieve a desired density or volume;

stopping the compression of said cylindrical substrate when a desired substrate density or volume is and applying a precious metal catalytic coating to the catalytic body.

* * * * *